(12) United States Patent
Shulepova et al.

(10) Patent No.: US 7,530,699 B2
(45) Date of Patent: May 12, 2009

(54) OPTICAL LENS COMPONENT AND OPTICAL LENS ARRANGEMENT COMPRISING THE LENS COMPONENT

(75) Inventors: Yelena Shulepova, Lommel (BE); Johan Francis Lurquin, Lommel (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 251 days.

(21) Appl. No.: 10/520,191

(22) PCT Filed: Jul. 1, 2003

(86) PCT No.: PCT/IB03/02988

§ 371 (c)(1),
(2), (4) Date: Jan. 4, 2005

(87) PCT Pub. No.: WO2004/005977

PCT Pub. Date: Jan. 15, 2004

(65) Prior Publication Data

US 2005/0243429 A1   Nov. 3, 2005

(30) Foreign Application Priority Data

Jul. 8, 2002   (EP)   .................. 02077726

(51) Int. Cl.
G02B 27/00   (2006.01)
(52) U.S. Cl. .................. 359/614; 359/599; 359/605
(58) Field of Classification Search .................. 359/599, 359/614, 601–608
See application file for complete search history.

(56) References Cited

U.S. PATENT DOCUMENTS

| 5,018,832 | A | | 5/1991 | Terunuma et al. |
| 5,385,276 | A | | 1/1995 | Yen-Tang |
| 5,550,657 | A | * | 8/1996 | Tanaka et al. .................. 349/62 |
| 5,880,886 | A | | 3/1999 | Milner |
| 5,980,454 | A | | 11/1999 | Broome |
| 6,239,922 | B1 | | 5/2001 | Nakamura |
| 6,285,515 | B1 | | 9/2001 | Kitazawa et al. |
| 6,304,710 | B1 | | 10/2001 | Baxter et al. |
| 6,568,820 | B1 | * | 5/2003 | Ohkawa et al. ............. 362/626 |
| 2003/0099045 | A1 | * | 5/2003 | Doi ........................... 359/725 |

FOREIGN PATENT DOCUMENTS

| DE | 19923226 A1 | 11/2000 |
| EP | 1124143 A2 | 8/2001 |
| JP | 56133701 A | 10/1981 |
| JP | 62011803 A | 1/1987 |
| JP | 62201401 A | 9/1987 |
| JP | 63047704 A | 2/1988 |
| JP | 02-221829 | * 9/1990 |
| JP | 04055871 A | 2/1992 |
| JP | 04218077 A | 8/1992 |
| JP | 2000098201 A | 7/2000 |
| JP | 2000298201 A | 10/2000 |

* cited by examiner

Primary Examiner—Joshua L Pritchett

(57) ABSTRACT

An optical lens component includes a lens element with a mounting portion. The mounting portion has spaced parallel surfaces that extend perpendicularly to the optical axis of the lens element. At least one of the spaced parallel surfaces is provided with a light-scattering structure for coupling out light entering the mounting portion. A light absorber is provided to absorb light scattered from the light-scattering structure.

21 Claims, 4 Drawing Sheets

OPTICAL LENS COMPONENT AND OPTICAL LENS ARRANGEMENT COMPRISING THE LENS COMPONENT

The present invention relates to an optical lens component, comprising a central lens element having an optical axis and located centrally of a circumjacent mounting portion having spaced parallel surfaces that extend perpendicularly to said optical axis.

An optical lens component of the kind indicated above is known for example from a brochure (pages 153-157) published on the internet (www.thorlabs.com) by Thorlabs Inc., a company having offices in Newton, N.J., USA. This document describes a variety of integral plastic aspheric lens components manufactured by advanced molding technology to produce an all-plastic near diffraction limited optical component for high-volume applications, such as the bi-aspheric lens CAY033 (f=3.3 mm, 0.45 NA). These optics combine the performance of an aspheric lens with a low price. In order to be able to mount the optical component in an optical assembly, a mounting portion is provided surrounding the central lens element having spaced parallel surfaces extending perpendicularly to an optical axis of the central lens element.

A common problem with optical elements is light-scattering. Light that is randomly scattered within an integral optical element can cause different problems depending on the application. In lens elements stray light may cause ghost images, light leakage, or light loss in the overall optical system of which the lens element is a part. Ghost images and stray light arise due to inter-reflections of light from optical element surfaces which have non-zero reflection and transmission coefficients. Some of the incident light is transmitted through the surface of an element, while some is reflected from the same surface. The reflected light is propagated back to another component surface, then it is reflected there, and eventually it propagates to the image plane or detector. These multiple reflections result in a ghost image and stray light.

Imaging lenses are designed to form an image of an object at a specific predetermined location in the image space. In a well designed system most of the light follows the predetermined designed light path. As discussed above, in some cases light may enter the system along other paths than the predetermined designed light path. This light eventually reaches the image sensor as so-called stray light or ghost images. In an integral optical lens component any additional portions of the lens component apart from the central lens element itself are optically connected to the lens element and may therefore contribute to any stray light problems as light may enter and exit these additional portions.

It is an object of the invention to provide a useful optical lens component of the kind described in the introduction in which stray light is prevented at least to some extent from reaching an image sensor so that a more ghost-free image can be provided by the integral lens component. To achieve this object, the optical lens component according to the invention comprises a central lens element having an optical axis and located centrally of a circumjacent mounting portion having spaced parallel surfaces extending perpendicularly to said optical axis, wherein at least one of said spaced parallel surfaces is provided with a non-random light-scattering structure for coupling out light entering said mounting portion, thus mitigating the above discussed problems of the prior art arrangements by coupling out stray light at the mounting portion.

An embodiment of the invention, the non-random light-scattering structure comprises indentations having parallel light-scattering surfaces with predetermined inclinations relative to said spaced parallel surfaces. A satisfactory solution may be designed by selecting the inclinations of the light-scattering surfaces for optimum performance. A practical embodiment may include an array of concentric circular indentations, with an optical component according to the invention incorporating a lens element which in most cases will be shaped as a solid of revolution.

The light-scattering structures may be provided by molding which is very cost effective in the optical lens component of the invention. Molding of the light-scattering structures into the optical component, allows the overall dimensions of the component to remain the same, while the method of mounting of the optical component in an optical system may also remain the same, due to the absence of any protrusions from the parallel surfaces of the mounting portion of such a molded integral optical component.

A light absorber may also be provided where any light coupled out of the optical lens component may thus be absorbed where it leaves the optical component, thus preventing any undue problems caused by stray light elsewhere in the optical lens arrangement.

The objects and features of the present invention will become more apparent by referring to the following non-limiting description of a preferred embodiment given with reference to the accompanying drawings in which.

Figure 1:
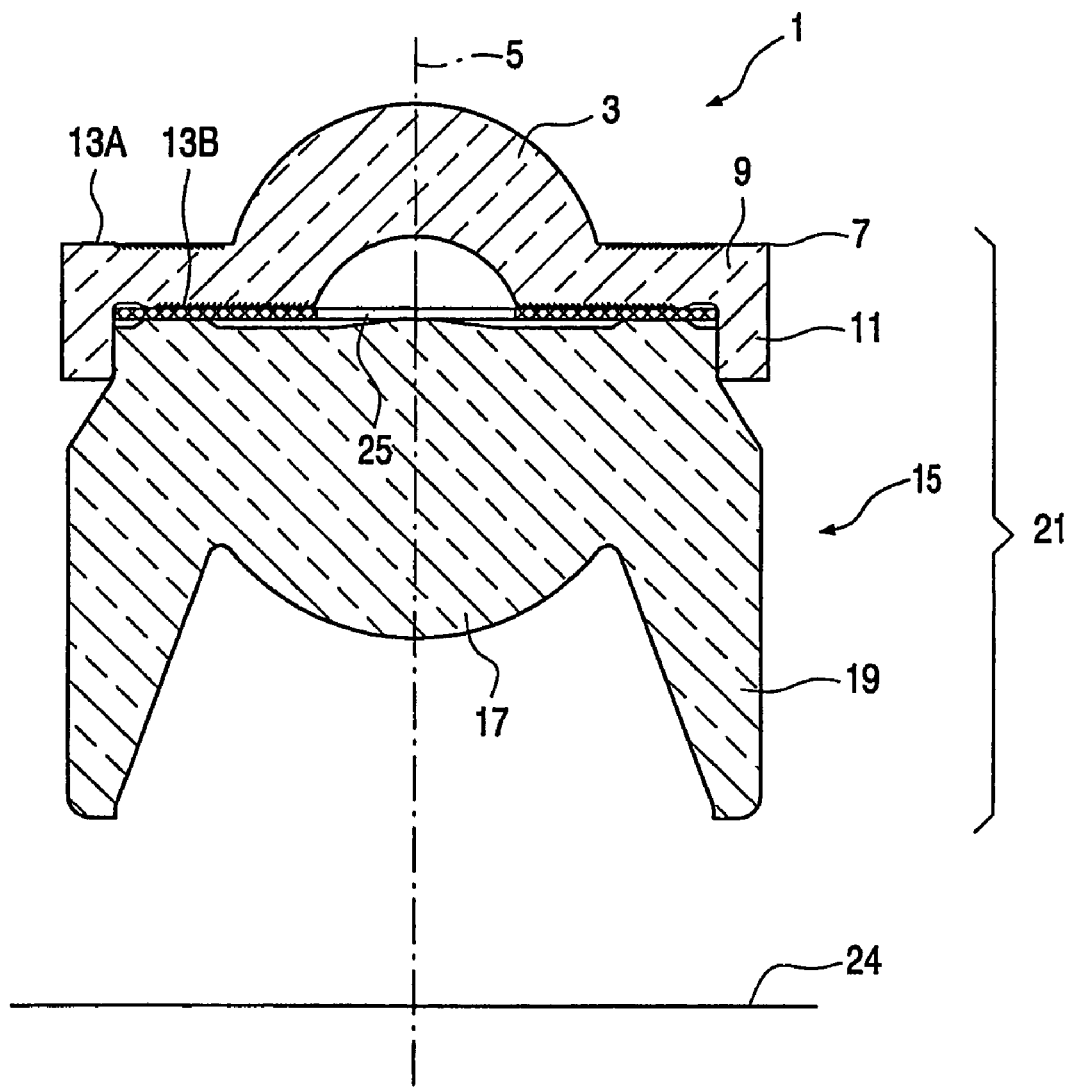
FIG. 1 is a side view in cross section of an optical lens assembly, comprising an optical lens component of the invention as well as a further optical lens component.

Referring to the drawings, a first optical lens component 1 is shown, manufactured from an optical grade plastic by molding, comprising a central lens element 3 having an optical axis 5 and located centrally of a circumjacent mounting portion 7 having spaced parallel surfaces 13A,B extending perpendicularly to said optical axis 5. The mounting portion 7 comprises a flange portion 9 and a circumferential annular downward skirt portion 11.

This first lens component 1 is mounted on top of a second integral optical lens component 15, also manufactured from an optical grade plastic and comprising a central lens element 17, centered on the optical axis 5 of the first lens component 1. This second lens component 15 is provided with a skirt portion 19 for mounting in a suitable mount (not shown). The first and second optical lens components, 1 and 15 respectively, together form an optical lens assembly 21. Such an optical lens assembly may in practice be used for camera modules in cell phones or personal digital assistants (PDAs). In an alternative application the lens assembly 21 is used for focusing a laser light beam reflected from an optical disc of an optical disc player (not shown) in an imaging plane 24. Both the first and second optical lens components, 1 and 15 respectively, are formed as bodies of revolution, so that the skirt portion 11 of the first lens component 1 and the top portion of the second lens component 15 snugly fit into each other as general cylindrical portions, centered on the optical axis 5 of the two lens components 1 and 15.

In addition to the lens components 1 and 15, the lens assembly 21 comprises a washer shaped light absorbing means 25 which will be discussed further below.

To prevent stray light from being projected onto the imaging plane 24, at least one and in the present case both of said spaced parallel surfaces 13A,B of the first lens component 1 is/are provided with a non-random light-scattering structure 23A and 23B, respectively, for coupling out light entering said mounting portion 7, which structures are to be discussed further below.

Figure 2A:
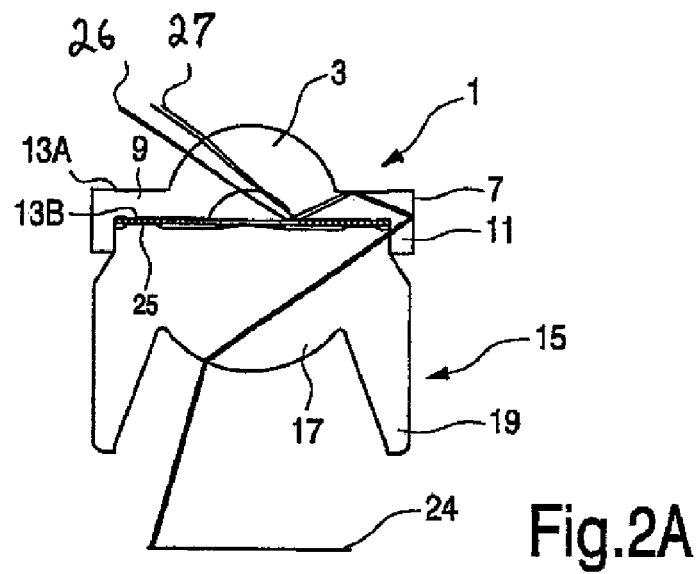
FIGS. 2A-2C are views of the optical assembly of FIG. 1, schematically indicating various typical paths of light beams which would be reflected by surfaces of the assembly and would contribute to undesirable stray light patterns in the imaging plane of the assembly if no light-scattering structure of the invention were provided.
Figure 2B:
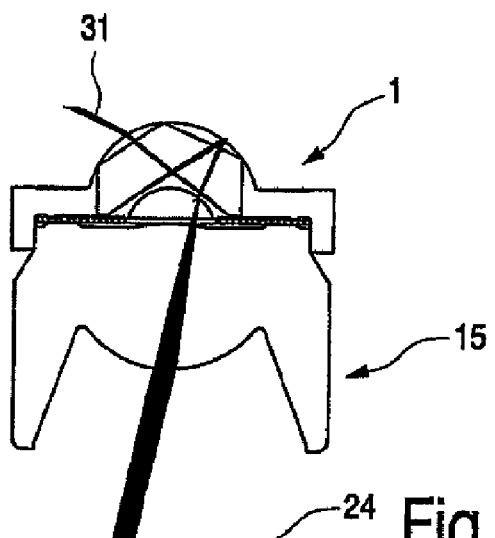
Figure 2C:
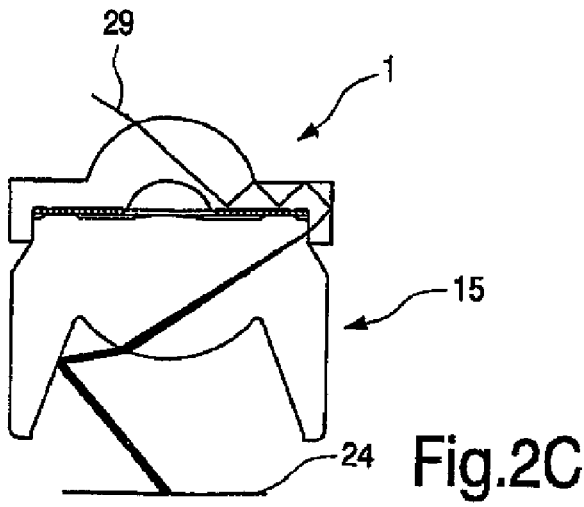

FIGS. 2A, 2B, and 2C show various examples of stray light beams entering the lens assembly 21 of FIG. 1, as well as the effect that would be produced by stray light reaching the imaging plane 24 in the hypothetical situation in which no light-scattering structures 23 A,B are present in the lens assembly 21. Fig 2A shows light beams 26 and 27 entering the lens element 3 of the lens component 1 from above and from the left. After entering the lens element 3 the light beams 26, 27 are internally reflected from the lower surface 13B of the flange portion 9, the top surface 13A, and the side surface of the skirt portion 11, and subsequently enters the second optical element 15. The beam then emerges at the lower surface of the lens element 17 of the second optical element and travels through air to the imaging plane 24.

FIGS. 2A, B, and C should not be regarded as an exact representation of the various trajectory parts and angles etc. of the light beams 26 and 27, but merely as explanatory indication. FIGS. 2B and 2C show light beams 29 and 31 entering the lens element 3 of the first optical element 1 and the paths followed by these beams until they impact on the imaging plane 24. After the detailed explanation of FIG. 2A, these Figures will speak for themselves so that no further explanation will be given.

Figure 3:
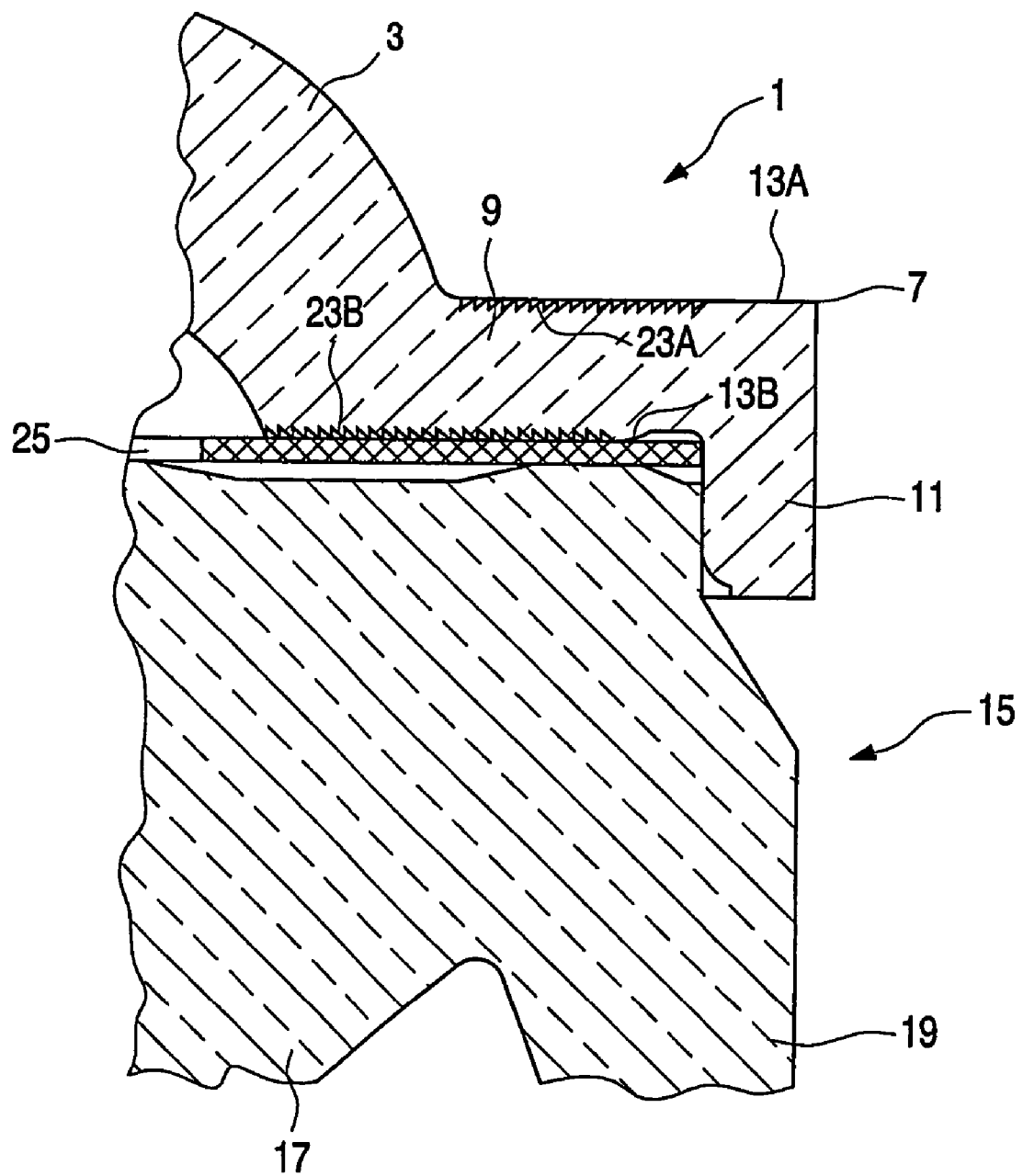
FIG. 3 is a section of FIG. 1 on an enlarged scale, showing details of the optical lens assembly
Figure 4:
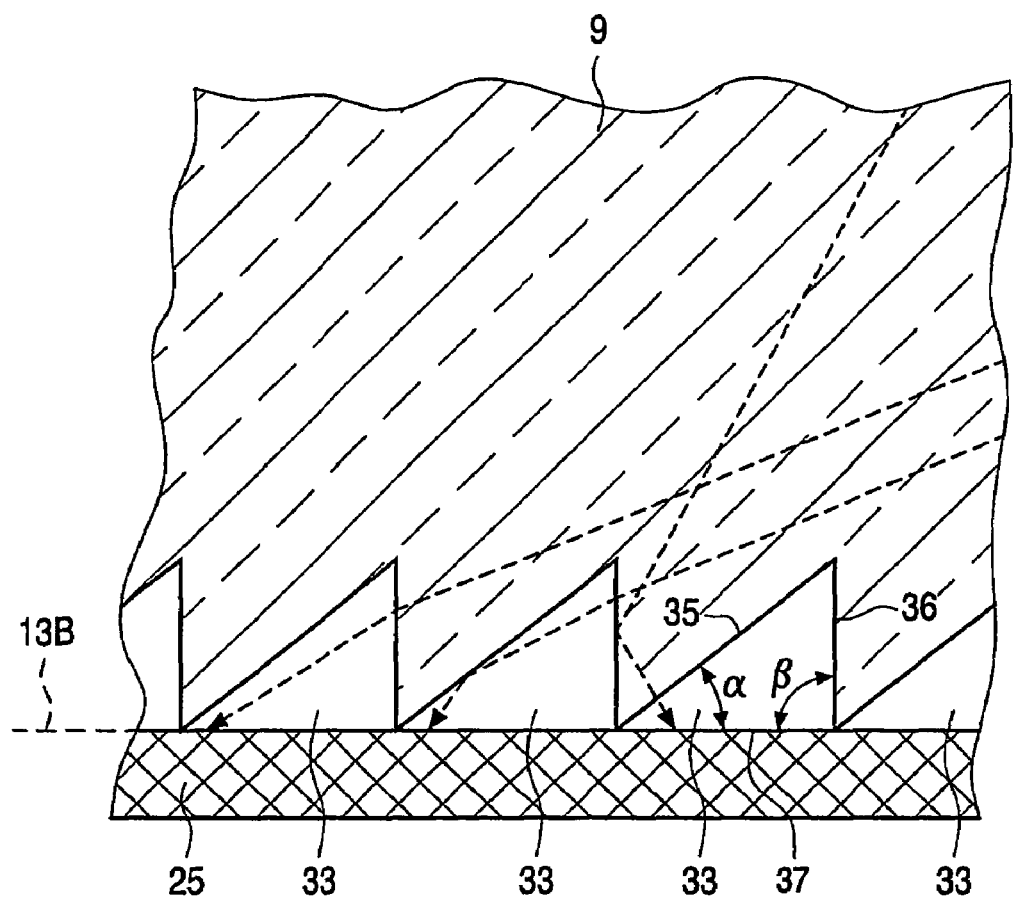
FIG. 4 is a detail of FIGS. 1 and 3 on a greatly enlarged scale, illustrating how light is coupled out of the integral optical lens component of the invention.

Referring to FIG. 1 and more particularly to FIGS. 3 and 4, it is shown that in the present embodiment both said spaced parallel surfaces 13A and 13B are provided with respective non-random light-scattering structures 23A, 23B for coupling out light entering said mounting portion 7. The non-random light-scattering structures 23A and 23B comprise indentations 33 having light-scattering surfaces 35 and 36 with predetermined inclinations α and β, respectively, relative to said spaced parallel surfaces 13A, B. In the example shown the angle α may be approximately 40 degrees and the angle β may be approximately 90 degrees. The precise orientation, depth, spacing angles, etc. of the indentations may be determined by experiment and calculation. In the example shown the optical lens component 1 has a general overall diameter of approximately 6 mm, the diameter of the convex upper lens portion of the central lens element 3 has a largest outer diameter of approximately 2.9 mm, the thickness of the flange portion 9 is approximately 0.55 mm and the depth of the indentations 33 is approximately 100 μm.

In the embodiment shown, the indentations are arranged in arrays of concentric circular indentations 33 centered on the optical axis 5 of the lens element 3. The indentations in the arrays have triangularly shaped cross-section in a plane including said optical axis 5 of the lens element 1. Also all indentations 33 have identically shaped cross-sections, the triangular shape being asymmetric relative to a local perpendicular.

In the embodiment shown, the triangular shape of the indentations 33 comprises a right angled triangle having one leg 37 lying in the plane of the respective spaced parallel surface 13B of said mounting portion 7, the second leg 36 being disposed on the side of the triangle facing said central axis 5 of the optical lens component 1. The light-scattering structures 23A,23B are provided by molding into the molded optical lens component from an optical grade plastic as is well known per se from the prior art. In the present case the light-scattering structures 23A,23B are provided in that they are integrally molded into the molded optical lens component 1.

FIG. 4 illustrates schematically how light rays indicated by broken lines and without reference numbers coming from different directions can reflect against internal or external surfaces of the indentations 33 and can be coupled out by passing through transparent surfaces of the indentations bordered by the hypothenuse 35 and the leg 36. Washer-shaped light absorbing means 25 are provided adjacent the non-random light-scattering structure 23B to absorb the light which is being coupled out of the optical lens component 1.

An optical lens component has thus been described according to a best mode for implementing the invention contemplated by the inventor at the time of writing the present specification. It will be appreciated by those skilled in the art that the invention is not limited to what has been particularly described and shown above. Many modifications are possible without departing from the inventive concepts herein. For example a plurality of separate light-scattering structures may be provided in different patterns at different locations and having indentations of different shapes. Instead of or in addition to indentations, protrusions may be provided for the purpose of coupling out light. The light-scattering structures may be provided by mechanical removal of material of the lens component after molding thereof or may be provided after molding by other methods such as hot stamping. All such and further embodiments not shown in the drawings and defined by independent claim 1 are deemed to fall within the scope of the invention.

For instance in the embodiments described above the indentions 33, shown in FIG. 4 have identically shaped cross sections, whereby the triangular shape is asymmetrical with respect to a local perpendicular. The same advantageous effects may be achieved with an optical component having indentions that have different shaped cross section.

Furthermore it will be clear to those skilled in the art that light may absorbed by other means than the washer shaped lighting means 25 shown in FIGS. 1 and 4. For instance light absorbing means may be present at the side of the optical component or lens assembly where the light beams enter the optical component or lens assembly.

Furthermore although the embodiments discussed above refer to molded optical lens components it will be clear to those skilled in the art that in alternative embodiments the optical lens component may be for instance a pressed glass optical component or a machined glass or plastic optical component

The invention claimed is:

1. An optical lens component comprising:
   a central lens element having an optical axis and located centrally of a circumjacent mounting portion having spaced parallel surfaces that extend perpendicularly to said optical axis and are in different planes,
   a non-random light-scattering structure comprises indentations for coupling out light entering said mounting portion, said non-random light-scattering structure being located on said spaced parallel surfaces in the different planes, and
   light absorbing means adjacent said non-random light-scattering structure and configured to absorb light scattered from said non-random light-scattering structure.

2. The optical lens component according to claim 1, wherein said indentations have parallel light-scattering surfaces with predetermined inclinations relative to said spaced parallel surfaces.

3. The optical lens component according to claim 1, wherein the indentations comprise at least one array of concentric circular indentations centered on said optical axis of the lens element.

4. The optical lens component according to claim 1, wherein the indentations have triangularly shaped cross sections in a plane in which said optical axis of the lens element is located.

5. The optical lens component according to claim 4, wherein the indentations arranged in at least one array have identically shaped cross sections.

6. The optical lens component according to claim 4, wherein the triangular shape is asymmetrical relative to a local perpendicular.

7. The optical lens component according to claim 6, wherein the triangular shape comprises a right angled triangle having a first leg and a second leg, the first leg lying in a plane of a respective surface of said spaced parallel surfaces of said mounting portion, the second leg being disposed on a side of the right angled triangle facing said central axis.

8. The optical lens component according to claim 1, wherein the optical lens component is molded to form a molded optical lens component, and the light-scattering structure is provided by molding with the molded optical lens component.

9. The optical lens component according to claim 8, wherein the light-scattering structure is provided by molding into the molded optical lens component.

10. The optical lens component of claim 1, wherein said light-scattering structure is located on both of the parallel surfaces and includes a first structure and a second a structure;
the first structure of the light-scattering structure being located on a first surface of the parallel surfaces, the first surface being near an image plane that is configured to receive the light coupled out of the light-scattering structure; and
the second structure of the light-scattering structure being located on a second surface of the parallel surfaces further from the image plane.

11. The optical lens component of claim 10, wherein the light absorbing means are located on the first surface.

12. The optical lens component of claim 1, wherein the light absorbing means are located on a first surface of the parallel surfaces, the first surface being near an image plane that is configured to receive the light coupled out of the light-scattering structure.

13. An optical lens comprising:
a lens element having an optical axis;
a mounting portion extending from the lens element, said mounting portion having spaced parallel surfaces that extend perpendicularly to said optical axis and are in different planes;
a light-scattering structure comprises indentations and configured to couple out light entering said mounting portion, said light-scattering structure being located on said spaced parallel surfaces in the different planes; and
a light absorber configured to absorb light scattered from said light-scattering structure.

14. The optical lens of claim 13, wherein said indentations have parallel light-scattering surfaces with predetermined inclinations relative to said spaced parallel surfaces.

15. The optical lens of claim 13, wherein said indentations comprise at least one array of concentric circular indentations centered on said optical.

16. An optical lens of claim 13, wherein said indentations have triangularly shaped cross sections in a plane of said optical axis.

17. An optical lens of claim 13, wherein said indentations are arranged in an array, said indentations having identically shaped cross sections.

18. An optical lens of claim 13, wherein said indentations have triangularly shaped cross sections, each of said triangular shaped cross sections being asymmetrical relative to a local perpendicular.

19. The optical lens of claim 13, wherein the light-scattering structure is located on both of the parallel surfaces and includes a first structure and a second a structure;
the first structure of the light-scattering structure being located on a first surface of the parallel surfaces, the first surface being near an image plane that is configured to receive the light coupled out of the light-scattering structure; and
the second structure of the light-scattering structure being located on a second surface of the parallel surfaces further from the image plane.

20. The optical lens of claim 19, wherein the light absorber is located on the first surface.

21. The optical lens of claim 13, wherein the light absorber is located on a first surface of the parallel surfaces, the first surface being near an image plane that is configured to receive the light coupled out of the light-scattering structure.

* * * * *